US007733808B2

(12) United States Patent
Hu et al.

(10) Patent No.: US 7,733,808 B2
(45) Date of Patent: Jun. 8, 2010

(54) PEER-TO-PEER AIDED LIVE VIDEO SHARING SYSTEM

(75) Inventors: Yusuo Hu, Beijing (CN); Chong Luo, Beijing (CN); Jian Tang, Beijing (CN); Jian-Guang Lou, Beijing (CN); Hua Cai, Beijing (CN); Jiang Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 817 days.

(21) Appl. No.: 11/558,878

(22) Filed: Nov. 10, 2006

(65) Prior Publication Data

US 2008/0112315 A1    May 15, 2008

(51) Int. Cl.
*G06F 11/00* (2006.01)
*H04L 12/56* (2006.01)
*H04N 7/16* (2006.01)

(52) U.S. Cl. .................. 370/256; 370/230; 370/329; 370/395.2; 725/150

(58) Field of Classification Search ......... 370/230–260, 370/395.2, 329, 311, 338, 335, 351; 725/13, 725/24, 135, 148–150; 709/206; 375/E7.019; 348/E7.071, E7.069, E7.083
See application file for complete search history.

(56) References Cited

U.S. PATENT DOCUMENTS

| 5,930,473 | A | 7/1999 | Teng et al. |
|---|---|---|---|
| 6,745,237 | B1 | 6/2004 | Garrity et al. |
| 6,941,575 | B2 | 9/2005 | Allen |
| 2003/0132939 | A1 | 7/2003 | Meshe et al. |
| 2003/0140093 | A1 | 7/2003 | Factor |
| 2003/0163339 | A1 | 8/2003 | Elliot |
| 2004/0078825 | A1 | 4/2004 | Murphy |
| 2004/0261127 | A1 | 12/2004 | Freeman et al. |
| 2005/0055718 | A1 | 3/2005 | Stone |
| 2006/0156330 | A1* | 7/2006 | Chiu ........................ 725/24 |
| 2007/0280255 | A1* | 12/2007 | Tsang et al. ............. 370/395.2 |

FOREIGN PATENT DOCUMENTS

WO    WO 01/17246 A1    3/2001
WO    WO 01/67302 A3    9/2001

OTHER PUBLICATIONS

"Delaware Valley video sharing system", Sep. 2003, retrieved from the Internet http://144.202.240.28/pman/projectmanagement/Upfiles/reports/fullI87.PDF.
Greg Sandoval, "Almost live from Grouper, it's your video", Jul. 17, 2006, retrieved from http://news.com.com/Almost+live+from+Grouper,+its+your+video/2100-1038_3-6095130.html.

(Continued)

*Primary Examiner*—Afsar M. Qureshi

(57) ABSTRACT

Video data from an upload client is received at a hosting node. A request from a download client is received at a bootstrapping node to receive the video data. The download client to receive the video data directly from the hosting node when the hosting node is below a threshold, wherein the threshold is based at least in part on the maximum number of download clients the hosting node can stream to simultaneously. The download client to receive the video data from peers in a peer-to-peer overlay when the hosting node above the threshold.

18 Claims, 10 Drawing Sheets

OTHER PUBLICATIONS

Morgenstern, et al., "Peer-to-peer architecture: the perfect match for streaming live video", A TeVeo White Paper, Nov. 2000, retrieved from the Internet http://www.davidmorgenstern.com/davidteveowhitepaper.htm.

Chong Luo et al. "Digiparty—A Decentralized Multi-Party Video Conferencing System", ICME '04, 2004 IEEE International Conference on Multimedia and Expo, Jun. 2004, vol. 3.

Chong Luo et al. "DigiMetro—An Application-Level Multicast System for Multi-party Video Conferencing", IEEE Communications Society, Globecom, 2004.

Meng Guo et al. "Scalable live video streaming to cooperative clients using time shifting and video patching", Twenty-third Annual Joint Conference of the IEEE Computer and Communications Societies, INFOCOM 2004, Mar. 2004, vol. 3.

Meng Zhang et al. "A Peer-to-Peer Network for Live Media Streaming—Using a Push-Pull Approach", MM'05, Nov. 2005.

Meng Zhang et al. "Large-Scale Live Media Streaming over Peer-to-Peer Networks through Global Internet", P2PMMS'05, Nov. 2005.

Xinyan Zhang et al. CoolStreaming/DONet: A Data-Driven Overlay Network for Efficient Live Media Streaming, Proceedings of IEEE INFOCOM, 2005.

Xinyan Zhang et al. "Data-Driven Overlay Streaming: Design, Implementation, and Experience", Proceedings of the ACM workshop on Advances in peer-to-peer multimedia streaming, 2005.

Tai T. Do et al. "P2VoD: Providing Fault Tolerant Video-on-Demand Streaming in Peer-to-Peer Environment", 2004 IEEE International Conference on Communications, 2004.

Yang-Hua Chu et al. "A Case for End System Multicast", IEEE journal on selected areas in communications on selected areas in communications, vol. 20, No. 8, Oct. 2002.

"Akamai Streaming—When Performance Matters", Akamai White Paper, Copyright 2004 by Akamai Technologies, Inc., retrieved from the Internet on Nov. 2, 2006 http://www.akamai.com/dl/whitepapers/Akamai_Streaming_Performance_Whitepaper.pdf.

* cited by examiner

SVS PROTOCOL STACK

LLP HEADER FORMAT

BANDWIDTH MEASUREMENT PACKET

TLP HEADER

MEMBERSHIP OVERLAY MESSAGE STRUCTURE

MSP PACKET HEADER

PEER-TO-PEER AIDED LIVE VIDEO SHARING SYSTEM

BACKGROUND

A number of applications and services that support sharing video files exist on the Internet. For example, some web sites allow users to upload video files to a database. These videos are also searchable via metadata provided in the submission process. Users can even charge audiences to view the videos.

Other web sites let video producers upload their video onto servers, arrange them into programs, display them to other Internet users, and make money if anyone watches them. However, these video hosting services are only for sharing stored video files. They do not enable the user to share the user's video or camera with others in real time.

Some web sites offer a comprehensive search engine of webcams from around the world. The portal maintains a database of live webcams on the Internet, allowing users to search by keyword or browse through the categories and subcategories. Users can see what is happening around the world in real time. However, these sites only provide searching and indexing of real time cameras. They do not provide any infrastructure support for sharing live videos.

Some video chatting services allow users to share cameras with others in real-time. However, most of these video charting applications use unicast methods to send video from the capturer to audiences and therefore can only serve a limited number of users in each session.

Overall, an efficient way for an ordinary Internet user to share a live video with a large audience in real time is still lacking.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Embodiments of the invention are directed to a system and method for sharing live video streams on a large scale through the Internet using a Shared Video Service (SVS). Embodiments herein include a peer-to-peer streaming technique where video data packets are exchanged among the audience. This technique relieves load and bandwidth stress on a content server and ensures the scalability of the SVS.

Many of the attendant features will be more readily appreciated as the same become better understood by reference to the following detailed description considered in connection with the accompanying drawings.

BRIEF DESCRIPTION OF THE DRAWINGS

Like reference numerals are used to designate like parts in the accompanying drawings.

DETAILED DESCRIPTION

The detailed description provided below in connection with the appended drawings is intended as a description of the present examples and is not intended to represent the only forms in which the present examples may be constructed or utilized. The description sets forth the functions of the examples and the sequence of steps for constructing and operating the examples. However, the same or equivalent functions and sequences may be accomplished by different examples.

Figure 1:
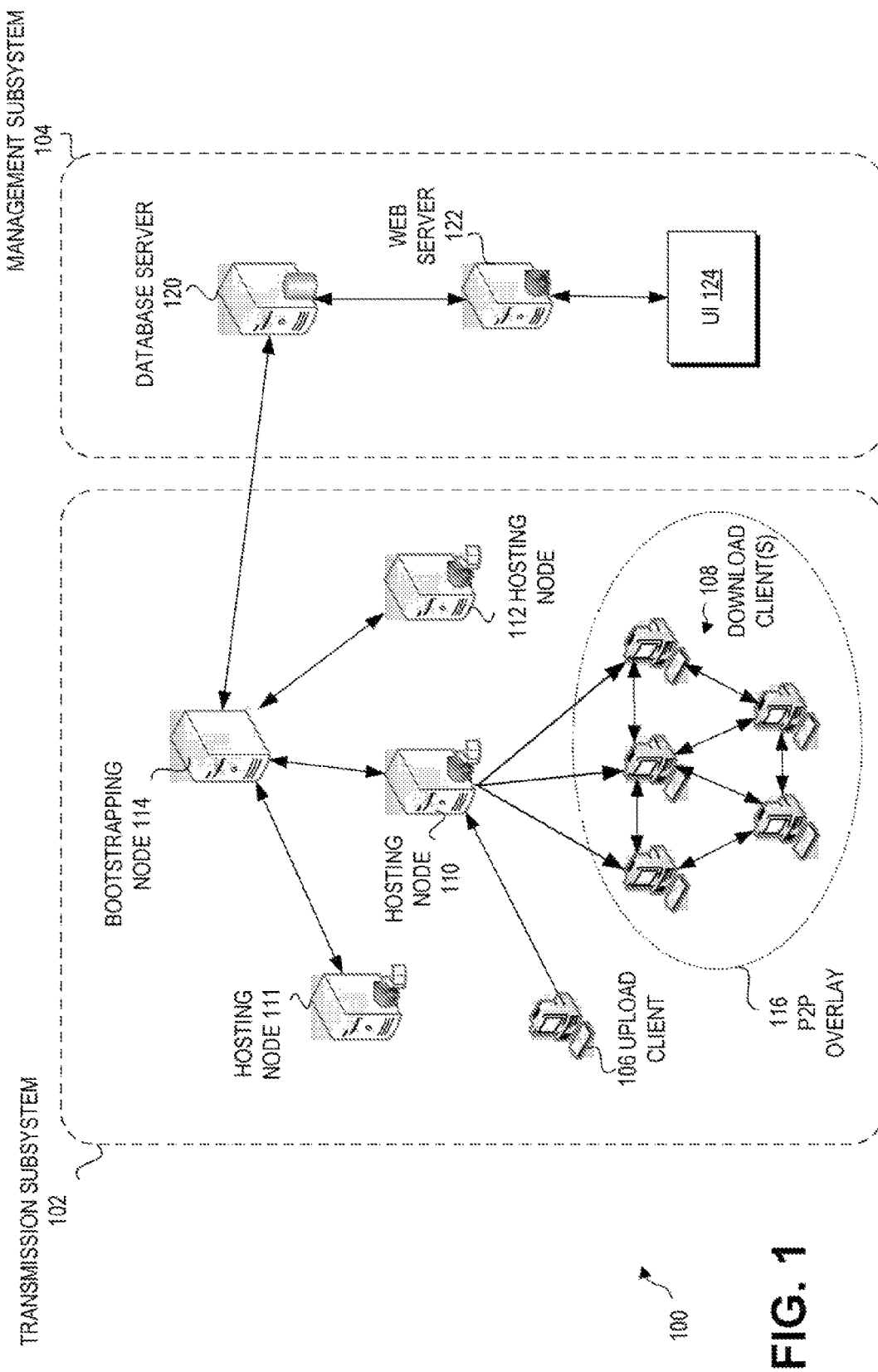
FIG. 1 is a block diagram of a SVS in accordance with an embodiment of the invention.

FIG. 1 and the following discussion are intended to provide a brief, general description of a suitable computing environment to implement embodiments of the invention. The operating environment of FIG. 1 is only one example of a suitable operating environment and is not intended to suggest any limitation as to the scope of use or functionality of the operating environment. Other well known computing systems, environments, and/or configurations that may be suitable for use with embodiments described herein including, but not limited to, personal computers, server computers, hand-held or laptop devices, mobile devices (such as mobile phones, Personal Digital Assistants (PDAs), media players), multiprocessor systems, programmable consumer electronics, network personal computers, mini computers, mainframe computers, distributed computing environments that include any of the above systems or devices, and the like.

Although not required, embodiments of the invention will be described in the general context of "computer readable instructions" being executed by one or more computing devices. Computer readable instructions may be distributed via computer readable media (discussed below). Computer readable instructions may be implemented as program modules, such as functions, objects, application programming interfaces (APIs), data structures, and the like, that perform particular tasks or implement particular abstract data types. The functionality of the computer readable instructions may be combined or distributed as desired in various environments.

1 System for Live Video Sharing

Embodiments of the invention are directed to a system and method for sharing live video streams on a large scale through the Internet called a Shared Video Service (SVS). SVS enables a user to share captured video with other people in real time, specify the metadata of the shared video for indexing and retrieval, search video of interest on the service using metadata, and watch shared video in real time. It will be understood that the term "video" includes a video and an audio portion. One skilled in the art will appreciate that embodiments of the invention may also be used with audio only streams or video only streams.

Turning to FIG. 1, a Shared Video Service (SVS) system 100 includes a transmission subsystem 102 and a management subsystem 104. Transmission subsystem 102 is responsible for video uploading, downloading, and peer-to-peer (P2P) relaying. Management subsystem 104 provides functionalities for browsing, searching, indexing, and managing shared videos.

When a user wants to share video through the SVS, the user sends a live or recorded video to an SVS hosting node. The hosting node receives video from the upload client and stores it. The video may include a live video stream captured by the upload client in real time or a video file (i.e., recorded video) stored on the upload client. In one embodiment, the user is required before to logon to the SVS prior to uploading any video.

Viewers (at the download clients) may browse and search for available videos on the SVS. Each shared video may have some associated metadata stored in the database server such as category, location, tags, and the like. Viewers can browse and search the videos using this metadata.

When viewers request a particular video, a hosting node connects with a bootstrapping node to stream the video to the viewer. The video streamed to the viewer may be being captured live or may be sent from a video file being sent by an upload client to the system in real time.

In one embodiment, to overcome limited bandwidth of the hosting nodes, a P2P streaming mechanism is designed to assist in video transmission. When the video hosting node reaches a threshold, such as its maximum capacity, the P2P mechanism begins working. All the download clients within the same video session form a location-aware overlay and live peer-to-peer streaming performed in a receiver-driven fashion.

1.1 Transmission Subsystem

Transmission subsystem 102 includes an upload client 106, one or more download clients 108, a hosting node 110 (additionally hosting nodes 111 and 112 are shown), and a bootstrapping node 114.

Upload client 106 acts as the source of a video. In one embodiment, upload client 106 captures live video, encodes the video streams, generates the packets and transmits them onto hosting node 110 in real time. In another embodiment, upload client 106 sends a pre-recorded video file in a live fashion to hosting node 110. In this embodiment, the video was captured and recorded at an earlier time. However, the recorded video is sent to hosting node 110 and streamed to download clients 108 in real time.

Figure 2:
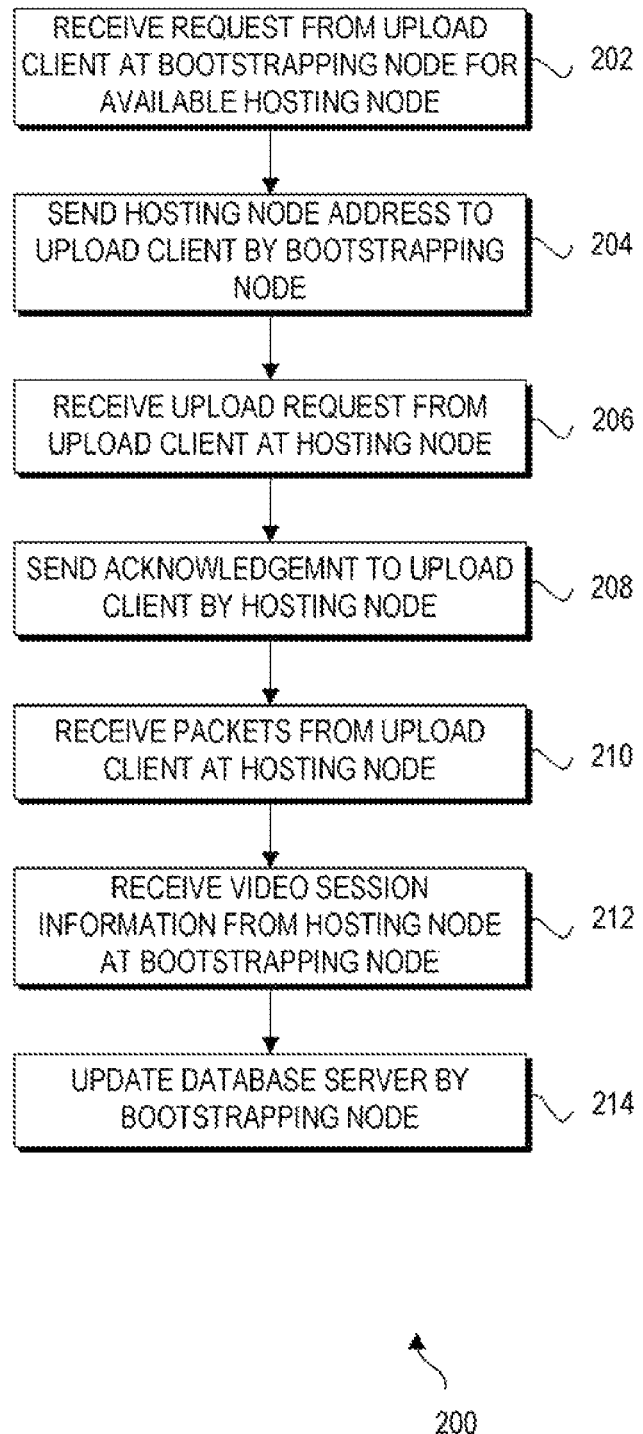
FIG. 2 is a flowchart showing the logic and operations of uploading video to an SVS in accordance with an embodiment of the invention.

Turning to FIG. 2, a flowchart 200 shows the operations of uploading a video to the SVS in accordance with an embodiment of the invention. To start a video session, upload client 106 first contacts bootstrapping node 114 to request an available hosting node (shown at block 202). Bootstrapping node 114 responds with address information for an available hosting node (shown at block 204). The bootstrapping node schedules a hosting node to the upload client according to the current loads of all the hosting nodes.

Next, upload client 106 sends an upload request to hosting node 110 (shown at block 206). After receiving an Acknowledgement (ACK) message from hosting node 110 (shown at block 208), upload client 106 then starts to send the video packets to hosting node 110 in their sequencing order (shown at block 210). After upload client 106 starts successfully sending video to hosting node 110, hosting node 110 registers the information of the new video session with bootstrapping node 114 (shown at block 212). Bootstrapping node 114 updates database server 120 with video session information. The video being sent by upload client 106 is now available for viewing at download clients 108. As discussed below, database server 120 tracks all video sessions within the SVS and may be searched by a user.

Figure 3:
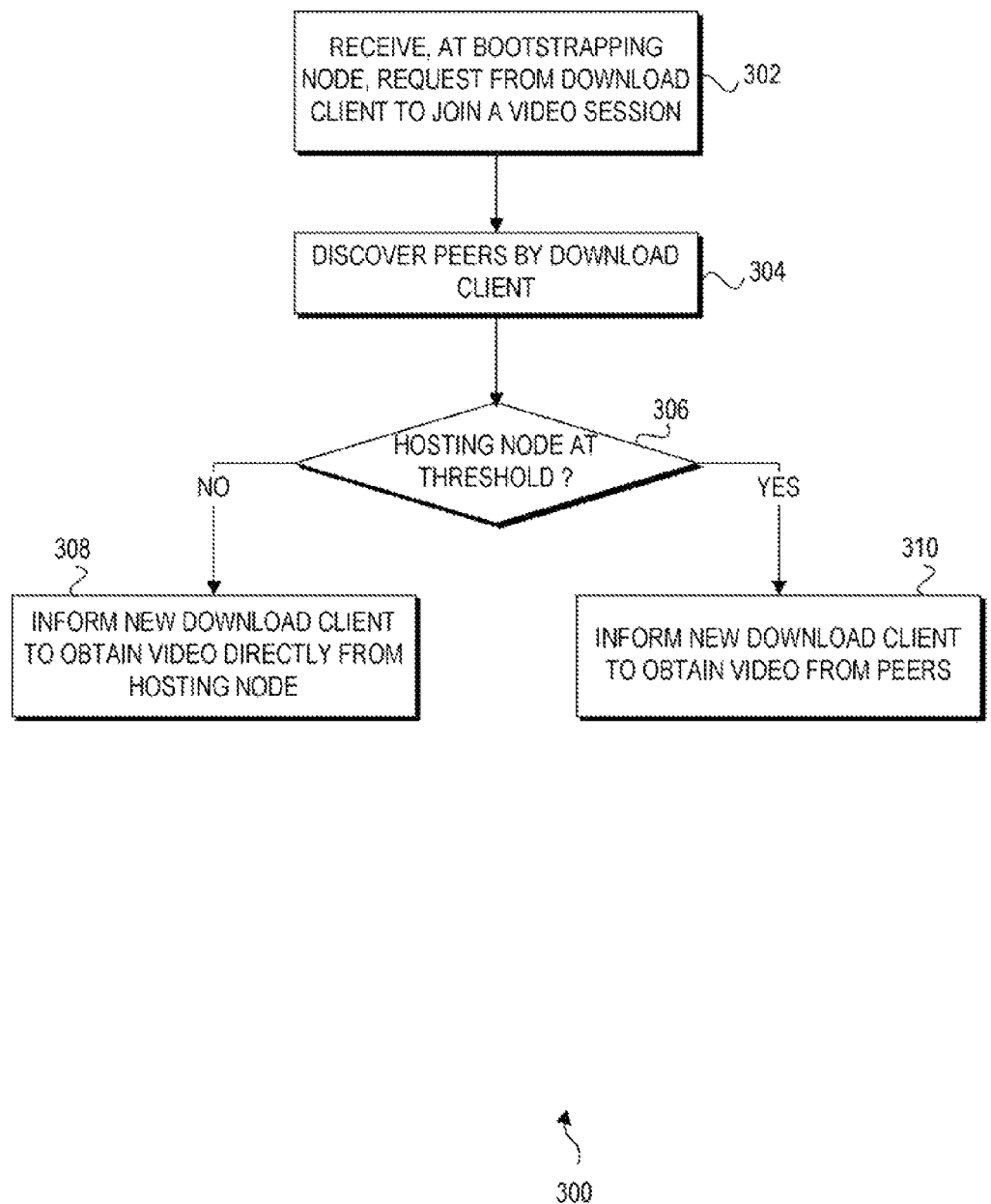
FIG. 3 is a flowchart showing the logic and operations of receiving video from and SVS in accordance with an embodiment of the invention.

Turning to FIG. 3, a flowchart 300 shows the operations of requesting a video by a download client in accordance with an embodiment of the invention. A download client 108 contacts bootstrapping node 114 to join an existing video session (shown at block 302). A downloading client (also referred to as a streaming client) only needs to know the bootstrapping node's address before beginning to view a video. Download client 108 also discovers some peers (i.e., other download clients) within the same video session and form its own neighborhood through the P2P overlay 116 (shown at block 304).

The bootstrapping node determines if the status of the video session is at a threshold (shown at block 306). In one embodiment, the threshold is based at least in part on the maximum capacity of the hosting node. The maximum capacity of the hosting node is the maximum number of download clients per video session the hosting node can stream to simultaneously. The maximum capacity may be affected by load limitations of the hosting node (e.g., SERVER_FULL-LOAD), traffic load on the network, any combination thereof, and the like. The threshold may be set at maximum capacity or at a portion of maximum capacity (e.g., 90%). If the hosting node is at the threshold for this video session, then the download client works in P2P mode and obtain the streaming packets from its overlay peers (shown at block 310). Otherwise, the download client contacts hosting node 110 to obtain the video directly from hosting node 110 (shown at block 308).

In one embodiment, when running in P2P mode, the download client uses a prefetch-pull streaming algorithm to get data from its peers (discussed below in section 2). The download client also periodically updates the peers according to the observed throughput. In one embodiment, the download client starts playback when a specified time interval has elapsed after receiving the first packet. At the download client, the received packets are first buffered in a transmission buffer pool, and then pulled on demand by the playback module of the download client.

Hosting node 110 handles the video upload from an upload client and streaming to the download clients (i.e., peers). The hosting node can be a dedicated server or a client node. For both cases, the hosting node has limited bandwidth and is assumed to be able to serve only a limited number of directly streaming download clients. The hosting node receives video packets from an upload client and sends the video packets to the download clients in real time.

Each hosting node can manage multiple video sessions. Each video session is identified by a video's identification (ID). Each video session serves a number of download clients and an upload client.

A hosting node registers its address with the bootstrapping node when joining the SVS (e.g., on boot up) and un-registers itself on exit from the SVS. A hosting node also periodically reports its load, including its total number of download clients and upload clients to the bootstrapping node, so that the bootstrapping node can manage the load balancing of all the hosting nodes.

A bootstrapping node 114 is deployed to help the download client peers to join the video session and discover other peers. The bootstrapping node handles all the requests from upload and download clients. It helps all the downloading clients to form a location-aware overlay through a membership overlay algorithm (discussed in section 2 below). The bootstrapping node may include a dedicated server or a client computer. In one embodiment, the bootstrapping node may be deployed on the same computer together with the hosting node.

Bootstrapping node 114 may include the following functionalities: hosting node management, video session management, P2P bootstrapping support, and video entry management.

In one embodiment, bootstrapping node 114 performs hosting node management. Each hosting node reports its address and streaming load to the bootstrapping node. When an upload client starts to upload, the upload client first contacts the bootstrapping node and queries for an available hosting node to host the video. The bootstrapping node schedules a hosting node to the upload client according to the current loads of all the hosting nodes.

In one embodiment, bootstrapping node 114 performs video session management. After an upload client starts successfully sending video to the hosting node, the hosting node registers the information of the new video session with the bootstrapping node. Such video session information may include video bit-rate, resolution, frame-rate, and the like.

The bootstrapping node monitors all the video sessions. The bootstrapping node records all download clients that receive streaming packers directly from a hosting node. When the bootstrapping node finds that a hosting node has reached its load threshold (e.g., maximum capacity), it notifies the newly joined download client to get video from other peers, i.e. streaming in a P2P fashion.

In one embodiment, bootstrapping node 114 performs P2P bootstrapping support. For each video session, the bootstrapping node may maintain a peer cache that contains a number of the random peers watching the video. The peer cache is periodically updated. If any peer wants to watch a shared video, it first contacts the bootstrapping node to join a corresponding streaming overlay. The bootstrapping node helps all the watching peers to form a location-aware overlay through the membership overlay algorithm.

In one embodiment, bootstrapping node 114 performs video entry management. When a new video session is established, the bootstrapping node calls a web service to add the entry into a database at a database server 120. When a video session is destroyed, bootstrapping node 114 calls the web service to remove the entry from the database at a database server 120. When the bootstrapping node exits the SVS, the bootstrapping node calls the web service to remove all the video entries from the database.

1.2 Video Management Subsystem

Referring again to FIG. 1, video management subsystem 104 includes a database server 120, a web server 122, and a browsing/sharing user interface (UI) 124.

All the video session entries and their metadata are stored and managed by database server 120. Each video has a unique entry (record) in the database. In one embodiment, the primary key of the record is the video ID. Each record may also include other metadata such as title, author name, width, height, bit rate, and frame rate of the video. The indexing table of the location, category, and tags are also stored in database server 120. Thus, all shared videos can be retrieved through these metadata. In one embodiment, video metadata is directly provided by upload client 106 to database server 120 through a web service and browsing/sharing UI 124.

Web server 122 is deployed as a unique entry point for the whole Shared Video Service. Some web services are developed on the web server to manage all the video entries and their metadata. These web services include the functionalities of browsing, searching, and authoring videos.

Web services of web server 122 may be accessed using browsing/sharing user interface 124. UI 124 responds to user actions or queries, calls the web services, and generates the appropriate views to users. Through user interface 124, users are able to browse all shared videos by metadata, share personal videos, author the metadata of individual shared video entries, and the like. Once a user finds a video of interest, the user may select the video through UI 124. The user's system (i.e., download client) may then request the video as described above in connection with download clients 108. Also, a user at upload client 106 may use UI 124 for uploading a video to the system.

Embodiments of the SVS may be used in various scenarios. In one example, in a breaking news event, such as a disaster or an accident, a by-stander person holds his or her camera phone and transmits live video to SVS. Official news-agency coverage of the event may begin much later, if at all. In another example, a camera from a window of a building is pointed to the intersection of two roads. Video is transmitted to the SVS in real-time. Drivers who will use this intersection watch the traffic situations in advance, during driving or in congestion. In another example, in an exploration or a journey, a traveler keeps his camera open. SVS subscribers watch the journey in real-time. In yet another example, television stations and news agencies may provide television programs and news through SVS.

Figure 4:
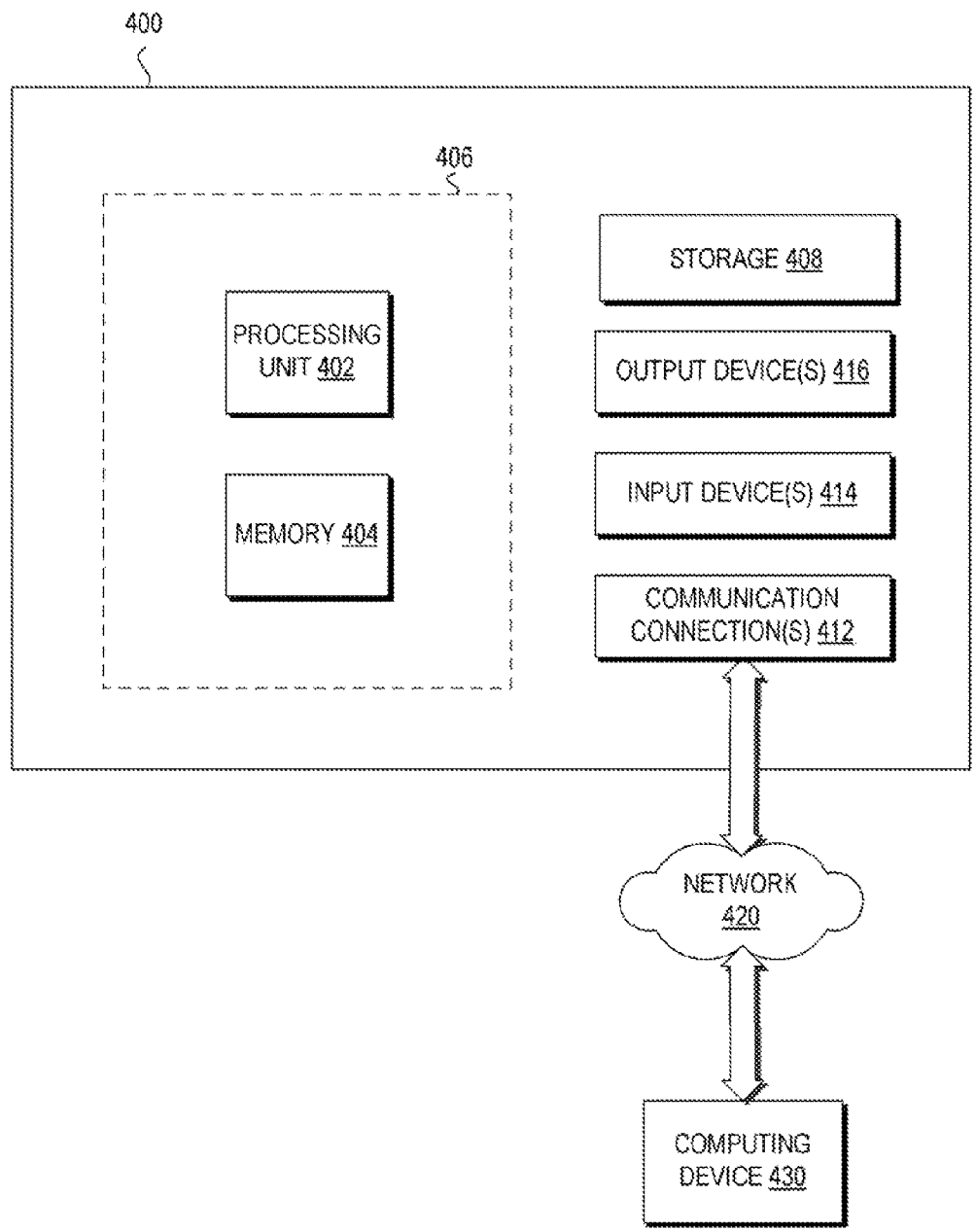
FIG. 4 is a block diagram of an example computing device for implementing embodiments of the invention.

Turning to FIG. 4, an example of a computing device 400 for implementing one or more embodiments of the invention is shown. Configurations of computing device 400 may be used as a bootstrapping node, a hosting node, an upload client, or a download client as described herein. Computing device 400 may also be used as a database server or a web server as described herein.

In one configuration, computing device 400 includes at least one processing unit 402 and memory 404. Depending on the exact configuration and type of computing device, memory 404 may be volatile (such as RAM), non-volatile (such as ROM, flash memory, etc.) or some combination of the two. This configuration is illustrated in FIG. 4 by dashed line 406.

Additionally, device 400 may also have additional features and/or functionality. For example, device 400 may also include additional storage (e.g., removable and/or non-removable) including, but not limited to, magnetic or optical disks or tape. Such additional storage is illustrated in FIG. 4 by storage 408. In one embodiment, computer readable instructions to implement embodiments of the invention may be stored in storage 408. Storage 408 may also store other computer readable instructions to implement an operating system, an application program, and the like.

The term "computer readable media" as used herein includes computer storage media. Computer storage media includes volatile and nonvolatile, removable and non-removable media implemented in any method or technology for storage of information such as computer readable instructions, data structures, program modules, or other data. Memory 404 and storage 408 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which can be used to store the desired information and which can be accessed by device 400. Any such computer storage media may be part of device 400.

The term "computer readable media" may include communication media. Device 400 may also include communication connection(s) 412 that allow the device 400 to communicate with other devices, such as with other computing devices through network 420. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media.

Device 400 may also have input device(s) 414 such as keyboard, mouse, pen, voice input device, touch input device, laser range finder, infra-red cameras, video input devices (also referred to as video capture devices) such as cameras, and/or any other input device. Output device(s) 416 such as one or more displays, speakers, printers, and/or any other output device may also be included. Input devices 414 and output devices 416 may be coupled to computing device 400 via a wired connection, wireless connection, or any combination thereof. In the following description and claims, the term "coupled" and its derivatives may be used. "Coupled" may mean that two or more elements are in contact (physically, electrically, magnetically, optically, etc.). "Coupled" may also mean two or more elements are not in contact with each other, but still cooperate or interact with each other (for example, communicatively coupled).

Those skilled in the art will realize that storage devices utilized to store computer readable instructions may be distributed across a network. For example, a computing device 430 accessible via network 420 may store computer readable instructions to implement one or more embodiments of the invention. Computing device 400 may access computing device 430 and download a part or all of the computer readable instructions for execution. Alternatively, computing device 400 may download pieces of the computer readable instructions, as needed, or some instructions may be executed at computing device 400 and some at computing device 430. Those skilled in the art will also realize that all or a portion of the computer readable instructions may be carried out by a dedicated circuit, such as a Digital Signal Processor (DSP), programmable logic array, and the like.

2 Peer-to-Peer Live Streaming Technique

This invention includes a system and method to allow sharing a live video stream from one computer to a large audience through the Internet. Most of current live streaming servers on the Internet use unicast techniques to send streaming video to their clients. That means each streaming client establishes a separate data channel with servers to receive an identical copy of the original video stream. When the number of the streaming clients increases, the bandwidth of a server will be exhausted. Therefore, such a transmission scheme is not scalable and cannot support large scale video services or applications.

Embodiments herein include a system and method for streaming a live video from a hosting node to many download clients. Through embodiments of the system, video from a camera connected to a computer or a file stored on a computer can be quickly and efficiently streamed out to a large number of download clients through the Internet.

Aspects of the P2P technique include: 1) a separate bootstrapping node to handle all the joining requests from new clients. This isolates the hosting node from a flash crowd of download clients to a video session and makes the video session more stable, 2) an algorithm to build a location aware overlay so that the peer joins the session with less latency and the streaming session will have less stress on the underlying physical network, and 3) a prefetch-pull method to improve the throughput of the peer-to-peer streaming system.

An efficient peer-to-peer streaming algorithm is developed to leverage the resource of downloading clients within the same video session. Therefore, the hosting node's load will be kept constant and the live video streaming session will be able to serve many more users than traditional streaming servers. Live video streaming has more stringent requirements than other file transfer applications. Meanwhile, most download client peers have limited bandwidth. Therefore, the peer-to-peer streaming algorithm should make efficient use of network resources to reduce latency and maximize the throughput.

Figure 5:
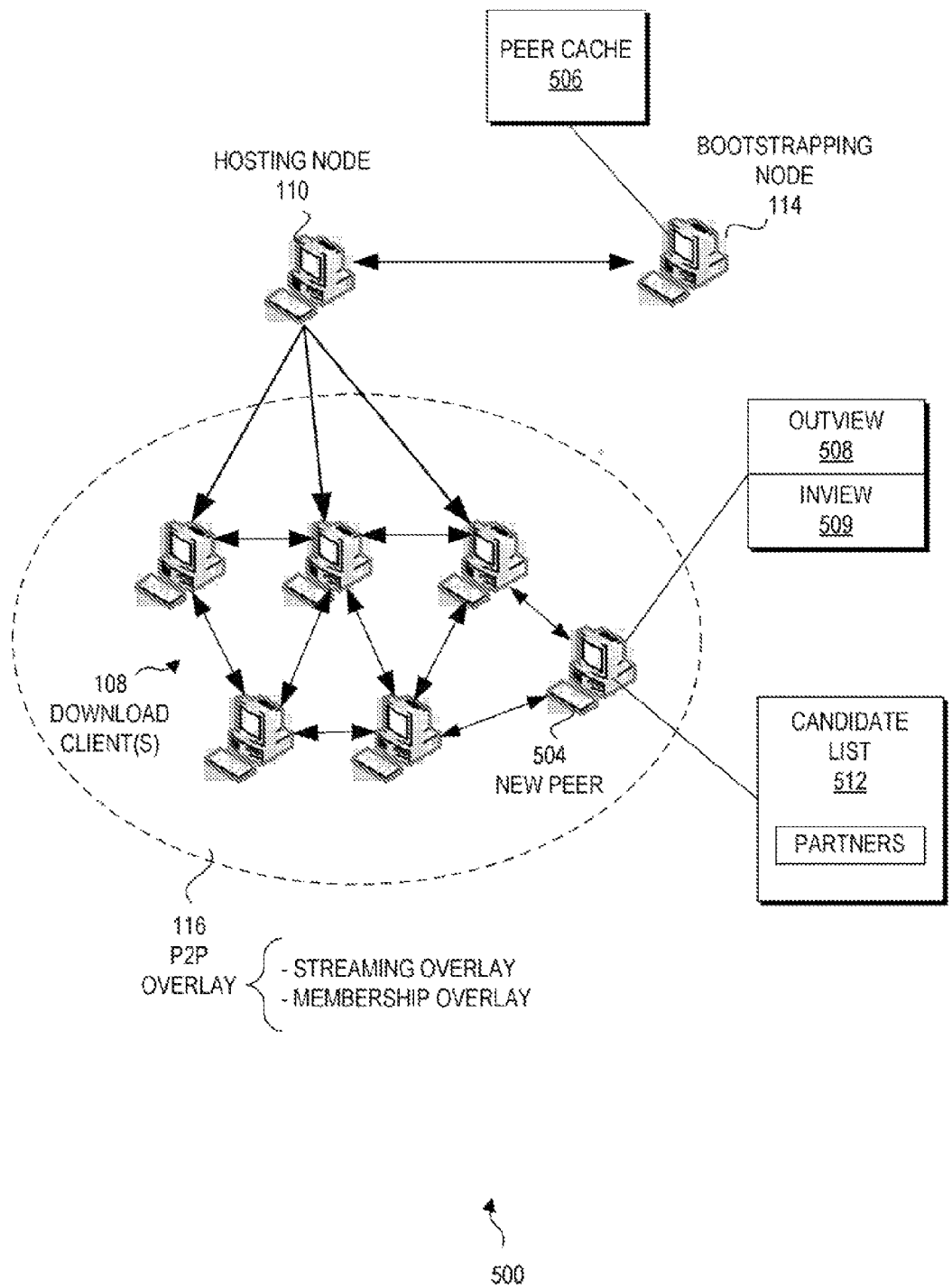
FIG. 5 is a block diagram of a Shared Video Service in accordance with an embodiment of the invention.

Turning to FIG. 5, an SVS system 500 is shown (a management subsystem is not shown for clarity). Embodiments herein of peer-to-peer streaming include a two-layer overlay. The lower layer of peer-to-peer overlay 116 includes a membership overlay, which is used for discovering nearby peers and disseminating messages. The upper layer includes a streaming overlay, which is used for transmitting real-time streaming packets. Embodiments of a new peer 504 joining P2P overlay 116 and streaming operations of new peer 504 are discussed below. It will be noted that an OutView, InView, partner list, and candidate list is shown only for new peer 504 for clarity, but it will be understood that each peer (i.e., download client) in P2P overlay 116 includes these components. As used herein, a download client may be referred to as a peer or a node of P2P overlay 116.

2.1 P2P Membership

In the membership overlay, each peer (i.e., each download client) has a number of "neighbors." The connection between a peer and its neighbor is modeled as a directional edge. Each peer maintains a node set called "OutView" 508 which stores all its neighbors. It also maintains a node set called "InView" 509 that stores all peers that take it as their neighbor. Each peer sends messages to the neighbors in its OutView and receives message from the neighbors in its InView.

In the streaming overlay, each peer has a number of "partners." The partners of a peer are a set of peers that can provide streaming packets to the peer more quickly and efficiently than other peers of the P2P overlay. The partners are not necessary the nearest peers. Although nearby peers can provide data in smaller latency, some of them may lack available bandwidth to serve the peer. The connection between a peer and its partner is modeled as an un-directional edge, i.e. the peer and its partner exchange data. A location aware overlay construction algorithm is designed to help the peer to construct an unstructured membership overlay and quickly find its peers.

Embodiments herein include a prefetch-pull combined algorithm designed to exchange packets with partners. It also monitors the throughputs between itself and its partners and dynamically adjusts the peers named as partners to get best streaming performance. It also includes a loop avoidance mechanism to prevent a peer from receiving the same data packets more than once.

2.1.1 Location-aware Membership Overlay Construction

Location-aware means that the peer-to-peer overlay is aware of the underlying physical network topology and tries to align the peer-to-peer communication with the underlying physical channel. In the membership overlay, each peer tries to find a number of nearby neighbors and a number of random neighbors. The OutView of each peer includes nearby neighbors and l random neighbors (in one embodiment, the settings used are k=8 and l=3).

In one embodiment, a nearby neighbor may be measured by roundtrip time for packets between peers. In another embodiment, a nearby neighbor may be measured by Internet Protocol (IP) address difference between peers.

2.1.1.1 Peer Cache

Bootstrapping node 114 maintains a peer cache 506 for the peer-to-peer overlay 116. The peer cache contains the hosting node and a queue of random nodes whose size is no more than a constant L.

Bootstrapping node 114 periodically discovers new random node(s) on the overlay to update peer cache 506. For this update, bootstrapping node 114 keeps M daemon processes on the bootstrapping node. Each daemon simulates a random walk process on overlay 116. Bootstrapping node 114 uses the node visited by the random walk every c steps as a sample and use the sampled nodes to update the peer cache queue in a (First In First Out) FIFO order.

2.1.1.2 Peer Join Procedure

Figure 6:
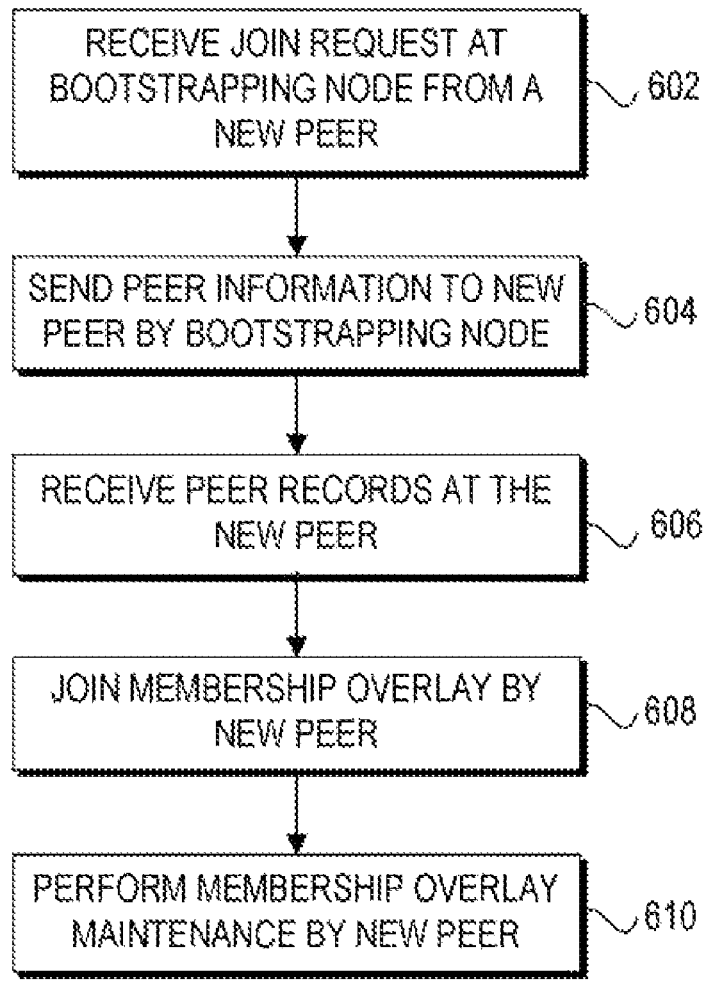
FIG. 6 is a flowchart showing the logic and operations of a peer joining a membership overlay in accordance with an embodiment of the invention.

Referring to FIG. 6, a flowchart 600 shows an embodiment of joining a membership overlay by new peer 504. A new peer first sends a join request to the bootstrapping node (shown at block 602). The bootstrapping node then selects k records from peer cache 506 which are nearest to new peer 504. The bootstrapping node also selects l random peers from the rest of the peer cache. The bootstrapping node returns the selected peer information back to the new peer (shown at block 604). If the cache size is less than k+l, the bootstrapping node sends information on all peers to the new peer.

After receiving the peer records (shown at block 606), the new peer joins the membership overlay (shown at block 608).

In one embodiment, the new peer P performs the following operations to join the membership overlay:

1) new peer P takes the l random peers as the random neighborhood. If there are no random peers in the records, the random neighborhood will be empty.

2) new peer P takes the k nearest peers as the initial nearest neighborhood, and starts the following locating process:

a) for each peer Q in $N_{nearest}(P)$, new peer P sends a Nearest Neighbor (NE) query to Q.

b) for each peer Q, when it receives a NE query, new peer P selects k nearest peers to new peer P from all its neighbors (including InView and OutView) and returns them as an acknowledgement of the NE query to new peer P.

c) find out the k nearest peers from the merged query result and update $N_{nearest}(P)$.

d) repeat step (a)-(c), until convergence. Convergence occurs when the median of the distances to the nearest peers does not change. At this point, new peer P stops the locating process and adds the k nearest peers observed so far to its OutView.

2.1.1.3 Membership Overlay Maintenance

The new peer (as well as the other peers) may perform membership overlay maintenance after having joined P2P overlay 116 (shown at block 610 of FIG. 6). Embodiments of membership overlay maintenance include handling a loss of communication with a peer and refining the overlay membership to adjust for peers entering or leaving the overlay.

Embodiments herein include techniques for peer failure handling. A peer may suffer from a system failure or a network disconnection. In the membership overlay, each peer stays alive with all its neighbors so that peer failure can be detected. Periodically, each peer sends heartbeat message to all its neighbors (such as those in the InView and OutView). When a peer does not receive a heartbeat message from one of its neighbor peers for a long time, it removes the peer from the InView and/or OutView. When a peer receives a low-level connection-broken event with one of its neighbor peer, it also removes the peer from the InView and/or OutView.

Embodiments herein include techniques for refining the overlay membership. In order to handle the dynamic change of Internet topology and peers' join and leaving, each peer is able to atomically refine its neighborhood. In one embodiment, each peer periodically performs the following operations in this order to refine the overlay membership:

1) the peer checks the nearest neighborhood, if it is less than k/2, it starts a new query process to update the nearest neighborhood. In this step, the peer's nearest neighborhood has become too small and needs to be increased to ensure uninterrupted streaming.

2) the peer checks the random neighborhood, if it is less than l, say i, it contacts the bootstrapping node, the bootstrapping node selects l−i random nodes from the cache and return them to the peer. The peer then adds them to the random neighborhood.

3) if a peer in the random neighborhood already exists in the nearest neighborhood, the peer removes it from the random neighborhood. However, the connection with the peer does not change, and the peer still exists in the peer's OutView while it is now regarded as one of the nearest neighbors instead of a random neighbor.

2.2 Peer-to-peer Streaming 2.2.1 Streaming Partner Discovery

The streaming overlay is a mesh, with every node having a few (4~6) partners to exchange streaming packets. Peers select their partners from a candidate list 512. A heartbeat mechanism is employed to maintain the partnership and to detect peer failures. Peers keep on refining their partners to achieve better streaming performances.

Figure 7:
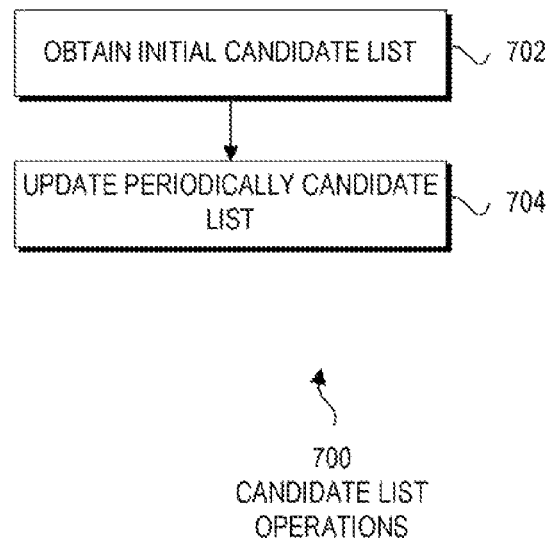
FIG. 7 is a flowchart showing the logic and operations of candidate list operations in accordance with an embodiment of the invention.

There are two entities involved in this phase: candidate lists and partners. Referring to flowchart 700 of FIG. 7, embodiments of candidate list operations are shown. The initial candidate list is obtained when a peer joints an overlay (shown at block 702). In one embodiment, a new joining peer obtains the candidate list from the nearest in-view peers in the member join process.

The candidate list is periodically updated including add, refresh, and remove (shown at block 704). Each peer periodically floods its "alive" information to its neighbors within two hops. The peer which receives an alive message updates the entry in its partner candidate list, or adds a new entry if the peer has not been on the list. This peer also checks the lifetime of each entry, and removes an entry if the time exceeds a given threshold.

Figure 8:
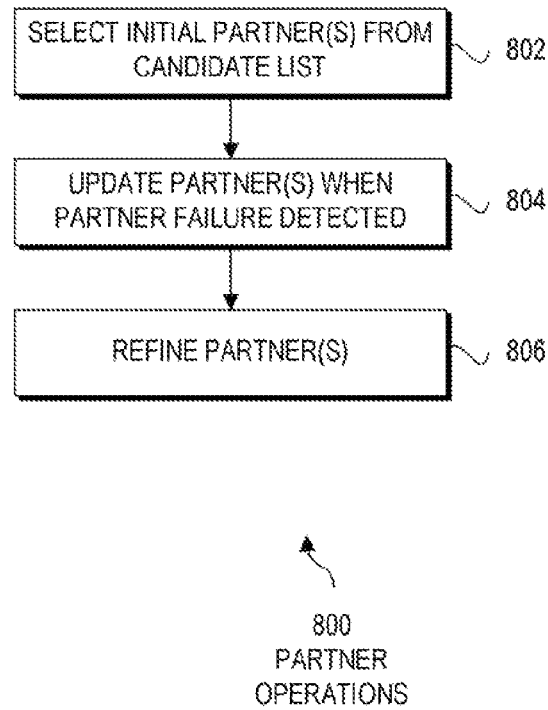
FIG. 8 is a flowchart showing the logic and operations of partner operations in accordance with an embodiment of the invention.

Referring to flowchart 800 of FIG. 8, embodiments of partner operations are shown. The initial partners are selected when the new peer joins the overlay by selecting 1-5 nearest partners from the candidate list (shown at block 802).

Partnership maintenance is performed (shown at block 804). Heartbeat messages are exchanged periodically between partners. When a partner failure is detected, the nearest available peer from the candidate list is selected to replace this partner. In the meantime, the failed partner is deleted from the candidate list.

The partners are refined to achieve better performance (shown at block 806). In one embodiment, the refinement procedure includes the following:

a) a routine refinement occurs periodically, such as every 10 seconds. The candidate list is checked to see whether there are any nearer nodes other than the current partner(s). If so, this nearer node becomes a new partner.

b) after each transmission round, if the bidirectional throughput to a partner is smaller than a given threshold, this partner is disconnected and a new partner is selected from the candidate list. The disconnected partner is given a poor flag in the candidate list. It will not be re-selected unless there are no other usable nodes.

2.2.2 Streaming Using a Prefetch-Pull Strategy

Once a partnership is established, a peer starts exchanging media data with its partners. Each peer uses a prefetch-pull strategy to get media data packets from its partners. Before describing the prefetch-pull strategy, the following concepts are discussed.

Media Buffer—Each peer in a streaming overlay has a media buffer to accommodate the received packets of the video stream. The media buffer may include a FIFO packet queue. The size L of the packet queue is fixed. If the media buffer is full, the oldest packet is removed as a new packet arrives.

Buffer Map—A buffer map is a bit vector with size of L. Each bit in the buffer map represents the availability of a single packet in the packet queue. Given the start sequence number and the buffer map, one can know which media packets are available in its packet queue. During streaming, each peer periodically publishes its buffer map to its partners.

Media Strips—In embodiments of the streaming algorithm, each video packet has a unique sequence number which is assigned by the hosting program, and the sequence number is used as an index of the video packet. Furthermore, a video stream is divided into P strips, and a packet with sequence number s belongs to the strip (s mod P).

2.2.2.1 Prefetch

Figure 9:
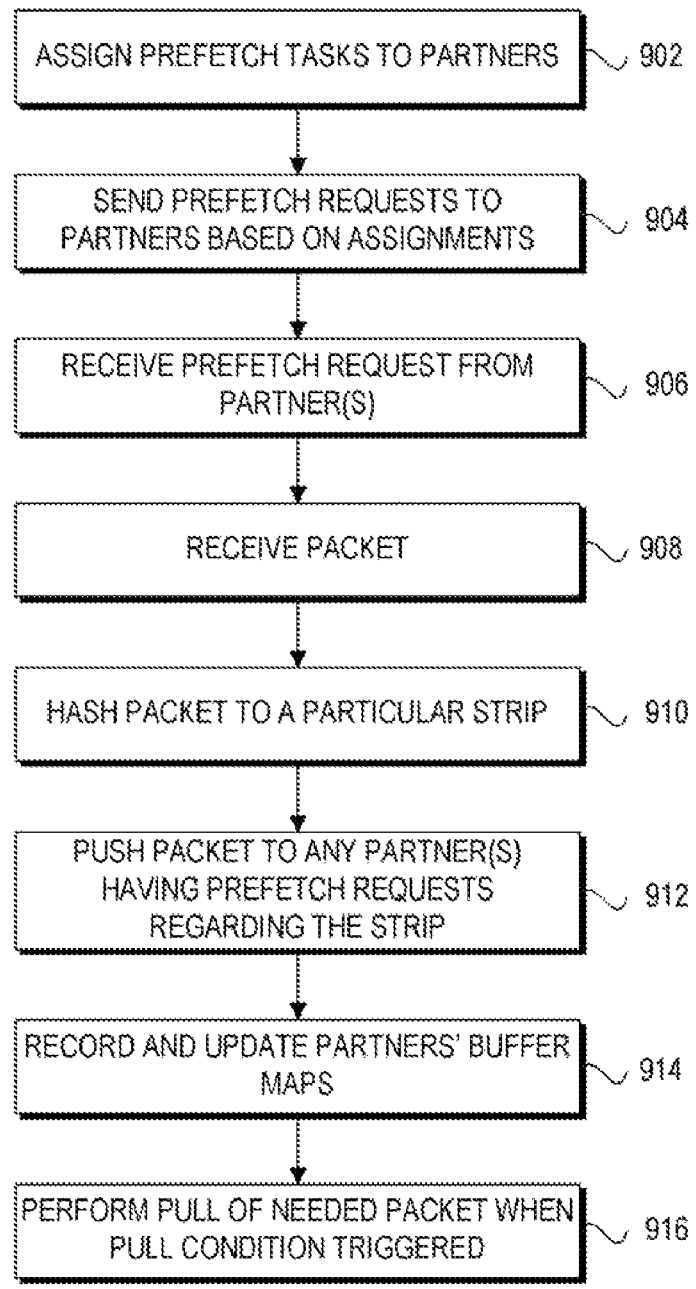
FIG. 9 is a flowchart showing the logic and operations of streaming using a prefetch-pull strategy in accordance with an embodiment of the invention.

Prefetch means that a peer can order some strips from one partner, and some strips from other partners. Turning to flowchart 900 of FIG. 9, an embodiment of a prefetch-pull strategy is shown. Periodically, there is a prefetch process. A peer assigns P prefetch tasks (each task corresponds to one strip) to its partners (shown at block 902). The prefetch task of strips is assigned to a partner according to the bandwidth and latency of the partner. In one embodiment, the statistic information of previous received packets in the prefetch scheduling is used. A strip is assigned to the partner from whom the peer has received maximal packets of that strip by now.

The assignment is sent as prefetch requests to partners (shown in block 904).

Each node also periodically receives prefetch requests from their partners due to the symmetric partnership (shown in block 906). An older prefetch request is updated by a new prefetch request from the same partner.

Whenever a peer receives a packet (block 908), it hashes the packet to one strip (shown in block 910). In one embodiment, peer uses the function (s mod P) as described above. The peer determines whether there are any prefetch requests regarding this strip having been received from any partners. If so, the peer immediately forwards the packet to the requesting partner(s). This forward operation may be referred to as a "push" (shown at block 912).

Because each peer independently schedules its own prefetching process, it is possible that several peers may form pre-fetching circles. In a pre-fetching circle, a peer receives two or more copies of the same packet because the peer has previously sent out a packet request to all of its partners. This wastes bandwidth and reduces streaming performance. To resolve this pre-fetching circle problem, each peer records and updates its partners' buffer maps once it has received/pushed a packet from/to a partner so that the peer will not push the same packet to a partner more than once (shown at 914). In one embodiment, the peer maintains a local copy of each partner's buffer map that is updated each time a packet is received or pushed by the peer. Local copies of the buffer maps at a peer are added/removed as the peer's partners are added/removed.

2.2.2.2 Pull

In one embodiment, the pre-fetching algorithm is a best-effort algorithm; there is no retransmission scheme to guarantee the quality of service (QoS). It is possible that some packets are lost due to network packet loss or congestion. In order to handle the possible pre-fetching failure of some packets, embodiments herein include a pulling strategy to proactively pull needed packets from partners if a pull condition is triggered (shown in block 916). For a pre-fetching failure, there are two pull conditions to trigger a pull for a packet: a general pull and an urgent pull.

In a general pull, the peer takes the available packet with the maximum sequence number in the peer's own buffer map as a reference, (denoted as position E.) Any non-received packet whose sequence number is smaller than (E-TH1) is scheduled to be pulled, where TH1 is a constant threshold. The non-received packet is pulled from a random selected partner whose buffer map (local copies of buffer maps stored at the peer) shows that it has the packet. Once a peer receives a pull request, it sends the required packet(s) as an acknowledgement.

In order to further reduce a failure possibility, an urgent pull request is scheduled if the peer fails to receive a packet in a certain time period TH2 before its playback time, where TH2 is another constant threshold. At the peer, a media playback module gets media data packets from the P2P streaming module for playing back the video. In embodiments herein, the playback timing is independent from the streaming scheme. The playback can start at a time several seconds after the first packet in the stream is received at the peer.

Embodiments herein include a peer-to-peer video streaming system that includes a location-aware unstructured peer-to-peer overlay and a prefetch-pull based streaming algorithm for transmitting video data among peers. Through embodiments of the system, live video streams can be sent to a large amount of receivers in a cost-effective way.

3 Peer-to-Peer Protocol Design

An embodiment of a P2P protocol design for communication between peers is described as follows. It will be understood that embodiments of the invention are not limited to use with the following P2P protocol design and other protocols may be used to implement embodiments of the invention.

3.1 Protocol Stack

Figure 10:
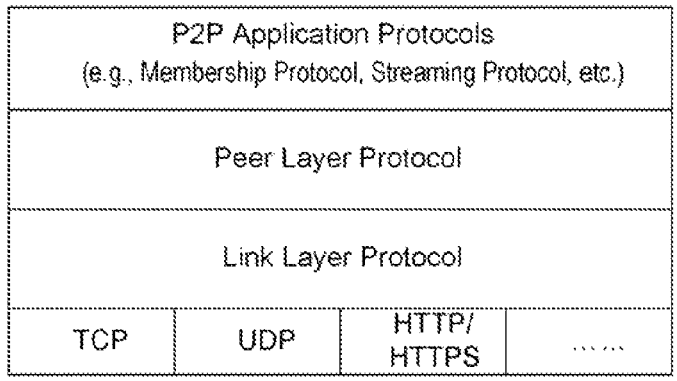
FIG. 10 is a block diagram of a Shared Video Service protocol stack in accordance with an embodiment of the invention.

To support efficient communication among peers, an extensible multiple layer protocol stack is used. The structure of the protocol stack is illustrated in FIG. 10.

3.1.1 Link Layer

The Link Layer is the lowest layer of the SVS protocol stack. The Link Layer tries to establish and manage all incoming/outgoing connections through the underlying transportation protocols such as TCP, UDP, and HTTP/HTTPS.

Because the peer may use multiple protocols to transmit data, one peer can have multiple addresses and ports. All of these addresses and ports of a peer are defined as the peer's ContactInfo and stored in the following format:

```
{    PROTOCOL_TYPE1 : IP1 : Port1,
     PROTOCOL_TYPE2 : IP2 : Port2,
     PROTOCOL_TYPE3 : IP3 : Port3, ... }
     ...
```

The definition of the ContactInfo makes it possible to support any common Internet protocols through the Link Layer modules. The Link Layer also monitors the status of the underlying connections and reports the events such as link failure or congestion to the upper peer layer. When necessary, the Link Layer level also performs Firewall traversal to help establish the connection between peers.

3.1.2 Peer Layer

The Peer layer is built on top of the Link layer and is responsible for application level networking.

Each peer is assigned a unique 128-bit ID. The Peer Layer protocol uses the peer ID as the application level address. After establishing application level connection through peer layer's hand-shake protocol, two peers can send and receive data simply through their IDs. The underlying communication events also are mapped into high level peer behaviors such as peer failure, peer connected, peer disconnected and the like.

Through the design of link layer and peer layer, the peer level communication is abstracted from the underlying transportation protocols. The upper peer-to-peer applications and protocols can be developed solely based on the uniform peer level communication interface. Such a design is very flexible. It makes the peer-to-peer development much easier and can support efficient transportation protocols as well.

3.1.3 Application Layer

As described above in section 2, for a peer-to-peer streaming application, two application level protocols are developed: 1) membership overlay protocol, which helps peers form a location-aware network; 2) streaming overlay protocol, which enables peers to exchange streaming packets.

3.2 Protocol Details

3.2.1 Link Level Protocol

Figure 11:
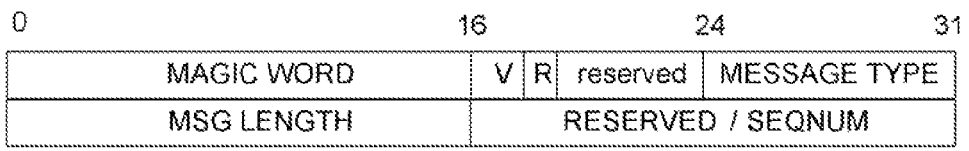
FIG. 11 is a block diagram of a Link Layer Protocol (LLP) header format in accordance with an embodiment of the invention.

The Link layer is the lowest layer of the SVS protocol stack which is in charge of the incoming and out going IP links including TCP, UDP and HTTP/HTTPS. All packets in the SVS system pass through this layer. An embodiment of the Link Layer Protocol (LLP) header has the format as shown in FIG. 11.

MAGIC WORD: 16-bit field contains the magic word "SV" of SVS.

V: 2-bit field contains the version of the protocol. The current version is 10 (binary).

R: 1-bit field indicates whether this packet is supposed to be sent via a reliable transmission channel. If this packet is received from the UDP channel, an ACK might needs to be sent upon receiving this message.

MESSAGE TYPE: 8-bit field contains the message type information. The message type is defined as:

```
////
//// Link layer message types
////
#define LLP_SYN        0x0001   //Used for establish a
                                connnectionless link
#define LLP_SYN_ACK    0x0002   //Used for establish a
                                connnectionless link
#define LLP_CLOSE      0x0008   //Close the link, connetionless
#define LLP_PRO        0x0003   //Probe message used to
                                measure RTT
#define LLP_PRO_ACK    0x0004   //Acknowledgement to the
                                probe message
#define LLP_MEM        0x0005   //Reserved for bandwidth
                                measurement
#define LLP_DATA       0x0080   //Data for the up layers
#define LLP_ACK        0x0006   //Ack for Data packet
```

MESSAGE LENGTH: 16-bit field contains the length of the packet in Bytes, including the LLP header.

SEQNUM (sequence number) is used for SYN/SYN_ACK and PRO/PRO_ACK messages.

3.2.1.1 SYN and SYN_ACK

To establish the UDP connection, a SYN message is first sent to the receiver with a SEQNUM. If the receiver receives the packet, it returns an SYN_ACK with the same SEQNUM. Once the sender receives the SYN_ACK, it makes sure that the connection is established. This mechanism is only used for UDP channels.

3.2.1.2 Probe and Answer Probe

The Probe and Answer Probe messages are a pair of messages used to measure the end-to-end latency. Both messages have the same body structure: a DWORD field that contains a timestamp. For every 10 seconds, a host sends a Probe message to every available UDP channel. The timestamp in the packet indicates the sending time. Upon receiving this message, the peer changes the message ID to Answer Probe and sends the packet back immediately. When the host receives the return packet, it can calculate the Round Trip Time (RTT) by subtracting the timestamp carried in the packet from the current time. The result is reported to the network monitor.

3.2.1.3 Acknowledgement

In SVS, there are basically two kinds of packets: control messages and video streams. While the loss of media data affects the communication quality, the loss of control messages is usually damaging. For example, loss of the subscription request keeps the subscriber waiting; loss of network status updates may result in network congestion. In one embodiment, the TCP channel is used in transmitting the control messages.

The LLP_ACK message is used to acknowledge the receipt of a need-ack packet. The body of the packet contains an 8-bit sequence number which indicates which packet the peer has received. An 8-bit field for the sequence number is used because the volume of need-ack packets probably will not be large.

3.2.1.4 Bandwidth Measurement

Figure 12:
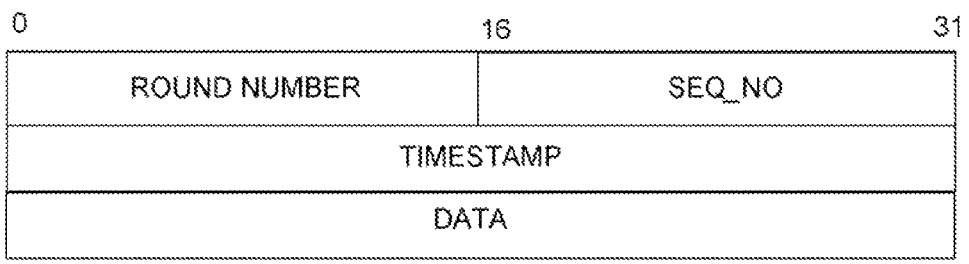
FIG. 12 is a block diagram of a bandwidth measurement packet in accordance with an embodiment of the invention.

In one embodiment, the bandwidth measurement packet structure of DigiMetro is used. DigiMetro is an application-level multicast system for multi-party video conferencing. The packet body has the format shown in FIG. 12. The first 16-bit field (ROUND NUMBER) indicates which round of measurement this packet belongs to. This is to avoid mixing packets from consecutive measurement processes. The second 16-bit field (SEQ_NO) contains the in-sequence number of this packet. The 32-bit timestamp records the sending time (TIMESTAMP).

The network monitor also allows the user to set and process the bandwidth measurement data at the application layer. Examples of the application layer assigned data are the user's display image and the most recent I-frame of the real-time video. This data can be passed to the network monitor through the exposed interface. By default, the network monitor uses a block of nonsense data for bandwidth measurement. The developer can also set a callback function if the developer wishes to process the measurement data. The structure of the data part can be defined by the developer.

3.2.1.5 Data

Message type "LLP_DATA" indicates that this packet belongs to an upper layer. In such a case, the Link management layer should detach the LLP header, and pass the LLP data to the upper level protocol.

3.2.2 Peer Level Protocol

Figure 13:
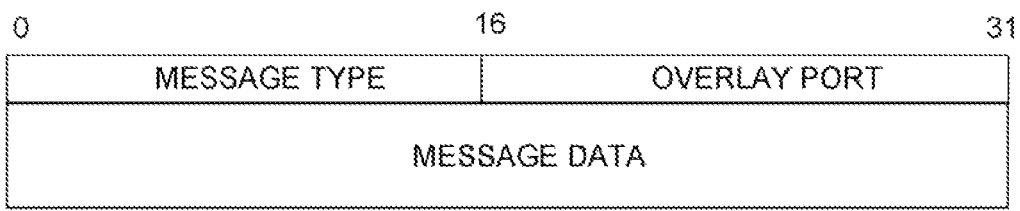
FIG. 13 is a block diagram of a Transport Level Protocol (TLP) header in accordance with an embodiment of the invention.

The Transport Level Protocol (TLP) handles the message from the connect level. The TLP header has the data fields as shown in FIG. 13.

MESSAGE TYPE: 16-bit field contains the message type information. The message type is defined as:

```
////
//// Peer layer message types
////
#define PLP_HELLO      0x0001   //Used as a heart beat message
#define PLP_SYN        0x0002   //Used for establish a peer
                                 conncetion
#define PLP_SYN_ACK    0x0003   //Acknowledge for the SYN
                                 message
#define PLP_DATA       0x0080   //Data payload for up layer
```

OVERLAY PORT: 16-bit field contains the overlay port number of the packet source. By using this port one can easily dispatch messages to different modules. In addition, one can also establish multiple overlay structures based on the same lower layers.

3.2.2.1 Hello

Unlike DigiParty (a multiparty video conferencing system), the Hello message is only used as a keep alive message. For every 5 seconds, a host sends a Hello message to every available UDP and IP multicast channel to keep the link alive. If a host has not received the Hello message for 30 seconds from a specific link, it assumes that the connection is broken.

3.2.2.2 SYN/SYN_ACK

The SYN message is mainly used for setting up a connection. After a connection object accepts a TCP connection request, the first message it receives from this connection should be a SYN message. Otherwise, the host closes this connection. A host also uses the SYN message to ping its peers through UDP and IP multicast channels. Upon receiving the SYN message, the peer manager checks whether there already exists a Peer object which is associated with the SENDER ID. If so, it updates the connectivity information for the object (e.g., set the UDP channel status to "available" if the SYN message is received from UDP). Otherwise, the peer manager creates a new Peer object and associates it with the SENDER ID in the packet header. The body of the SYN message contains the SENDER ID.

3.2.2.3 Data

Message type "PLP_DATA" indicates that this packet belongs to an upper layer. In such a case, the Link management layer should detach the Peer Layer Protocol (PLP) header, and pass the PLP data to the upper level protocol.

3.2.3 Membership Overlay Level Protocol

Through maintaining a consistent membership overlay, the system connects all peers together with location-awareness. Peers can join and find nearest neighbors very quickly. Though the streaming partners do not necessary correspond to the nearest nodes, and the streaming overlay does not necessarily match the topology, the location-aware property of the membership overlay can facilitate a peer to find good streaming partners. In addition, the membership overlay also supports abundant distributed operations through P2P communication. The protocol of the membership overlay is described as follows.

3.2.3.1 Message Structure

Figure 14:
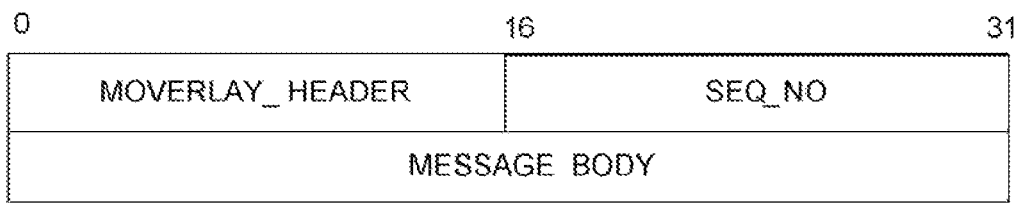
FIG. 14 is a block diagram of a membership overlay message structure in accordance with an embodiment of the invention.

The Membership overlay message structure includes data fields as shown in FIG. 14.

```
struct MOVERLAY_HEADER
{
    SVS_Msg_Type   m_MsgType;   //The message type
    UInt16         m_SeqNo;
};
```

3.2.3.2 Message Type m_MsgType is a 16-bit message word. In embodiments herein, all incoming messages are delivered to both of the membership overlay and the streaming overlay. The value of the highest bit of the message type is used to distinguish the messages. A message whose highest bit is 1 is processed by the streaming overlay. Otherwise, it is a message for the membership overlay.

For message types of the membership overlay, the higher byte is the destination description. The lower byte contains the message ID.

Membership Overlay Message IDs

```
#define  SVSOVERLAY_RANWALK        0x0001   //Random walk
#define  SVSOVERLAY_ACK_RANWALK    0x0009   //ACK of the Random walk
message
#define  SVSOVERLAY_RANWALK_D      0x000B   //Random walk message with
data from above level
#define  SVSOVERLAY_FLOOD_L        0x0002   //Flood
#define  SVSOVERLAY_FLOOD_D        0x000A   //Flood message with data from
above level
#define  SVSOVERLAY_QUE_RAND       0x0003   //Require random message from
bootstrapping server
#define  SVSOVERLAY_ACK_RAND       0x0004   //Ack of the require random
message from bootstrapping server
#define  SVSOVERLAY_QUE_NEAR       0x0005   //Require nearest peers from
bootstrapping server
```

-continued

```
#define  SVSOVERLAY_ACK_NEAR        0x0006   //Ack of the require nearest
peers from bootstrapping server
#define  SVSOVERLAY_REQ_CON         0x0007   //Request to be add as an inlink
#define  SVSOVERLAY_ACK_CON         0x0008   //Acknowledge of the request
#define  SVSOVERLAY_QUIT            0x000C   //Request to quit the
membership overlay
#define  SVSOVERLAY_FLOOD_QUIT      0x000D   //Request to quit the whole
overlay (sent by bootstrapping node)
#define  SVSOVERLAY_REQ_JOIN        0x000E   //Request to join a membership
#define  SVSOVERLAY_ACK_JOIN        0x000F   //Ack to join a membership
```

Membership Overlay Message Destination Description

```
#define  SVSOVERLAY_NINVIEW    0x0100   //near in view
#define  SVSOVERLAY_RINVIEW    0x0200   //random in view
#define  SVSOVERLAY_NOUTVIEW   0x0400   //near out view
#define  SVSOVERLAY_ROUTVIEW   0x0800   //random out view
#define  SVSOVERLAY_SERVER     0x1000   //the bootstrapping
                                         node
#define  SVSOVERLAY_INVIEW     0x0300   //all in views
#define  SVSOVERLAY_OUTVIEW    0x0C00   //all out views
#define  SVSOVERLAY_ALLVIEW    0x0F00   //all views
```

3.2.3.3 Random Walk

Random walk is a basic function or message of a membership overlay. Random walk can be used to select random neighbors when a peer tries to join a membership overlay, and can be used to select random nodes over the membership overlay. In some embodiments of the protocol, biased forwarding and biased halting schemes are not supported. Once a peer received a random walk message from its neighbor, it decreases the hop number of the message. If the hop number is larger than zero, the peer only selects a random peer from destination neighbors (refer to the Membership Overlay Message Destination Description in the previous section) and directly forwards the message. Otherwise, the peer will not forward further and send a random walk acknowledge message to the peer which is the source of the random walk message (for a SVSOVERLAY_RANWALK_D message, the membership overlay delivers the data payload to the upper layer (i.e., the streaming overlay) and does not send an acknowledge message to the source peer. The upper layer can send their own acknowledge message according the received data.)

There are two message types including SVSOVERLAY_RANWALK and SVSOVERLAY_RANWALK_D. SVSOVERLAY_RANWALK is a message only for membership overlay maintaining such as peer joining and membership refinement. SVSOVERLAY_RANWALK_D is a data conveying message for the upper layer.

An embodiment of a message body of a random walk message is as follows:

```
struct MOVERLAY_RANDOM
{
MOVERLAY_HEADER    m_Header;    //the message header of the
                                  message
int                m_Hops;      //the hop number
BYTE               m_Data[0];   //the PeerInfo of the source
                                  message. For
SVSOVERLAY_RANWALK message, data is a contactinfo
structure. For SVSOVERLAY_RANWALK_D message,
data is a contactinfo structure + upper layer data.
};
```

An embodiment of a message body of random walk acknowledge message is as follows:

```
struct MOVERLAY_RANDOM_ACK
{
MOVERLAY_HEADER    m_Header;
GUID               m_VideoID;   //the Port of the overlay
Peer_Info          m_Info;      //the local ContactInfo
                                  structure
};
```

3.2.3.4 Flood Message

A flood message is also a basic function or message of a membership overlay. Once a peer receives a flood message from its neighbor, it decreases the hop number of the message. If the hop number is larger than zero, the peer directly forwards the message to destination neighbors (please refer to the Membership Overlay Message Destination Description in the previous section). Otherwise, the peer will not forward message. There are two message types including SVSOVERLAY_RANWALK and SVSOVERLAY_RANWALK_D. SVSOVERLAY_RANWALK is a message only for membership overlay maintaining such as peer joining and membership refinement. SVSOVERLAY_RANWALK_D is a data conveying message for the upper layer. For a SVSOVERLAY_RANWALK_D message, the membership overlay delivers the data payload to the upper layer.

An embodiment of a message body of random walk message is as follows:

```
struct MOVERLAY_FLOOD
{
MOVERLAY_HEADER    m_Header;    //the message header
                                  of the message
int                m_Hops;      //the hop number
BYTE               m_Data[0];   //For
                                  SVSOVERLAY_FLOOD
                                  message,
data is a contactinfo structure of the source peer. For
SVSOVERLAY_FLOOD_D message,
data is a contactinfo of the source peer + upper layer data.
};
```

3.2.3.5 Query Random Candidates

As mentioned above, a peer can query random out links from the bootstrapping node. An embodiment of a query message is defined as below.

```
struct MOVERLAY_QUE_RAND
{
MOVERLAY_HEADER    m_Header;      //the message header
                                  of the message
UInt16             m_Num;         //The number of
                                  random peer
UInt16             m_Reserved;
PORTTYPE           m_SrcPort;     //the overlay Port of the
                                  querying peer
ID                 m_VideoID;     //The video ID
Peer_Info          m_Info;        //the local contactinfo
};
```

Once a bootstrapping node receives a MOVERLAY_QUE_RAND message, it replies with an acknowledgement MOVERLAY_ACK_RAND.

```
struct MOVERLAY_ACK_RAND
{
MOVERLAY_HEADER    m_Header;
UInt16             m_Num;         //The number of
                                  random peers
UInt16             m_Reserved;
BYTE               m_Data[0];     //the random peer IDs,
                                  ports and
contactinfos
};
```

3.2.3.6 Query Nearest Peer Candidates

As mentioned earlier, a peer may query k nearest peers from the bootstrapping node and its out-links. An embodiment of the query message is as follows.

```
struct MOVERLAY_QUE_NEAR
{
MOVERLAY_HEADER    m_Header;
UInt16             m_Num;         //The number of peers
UInt16             m_Reserved;
PORTTYPE           m_SrcPort;     //the overlay Port of
                                  the requester
ID                 m_VideoID;     //The video ID
Peer_Info          m_Info;        //the local contactinfo
};
```

Once a bootstrapping node or a normal peer receives a MOVERLAY_QUE_NEAR message, it finds out the m_Num nearest peers from its cached peers and replies with an acknowledgement MOVERLAY_ACK_NEAR.

```
struct MOVERLAY_ACK_NEAR
{
MOVERLAY_HEADER    m_Header;
UInt16             m_Num;         //The number of peers
UInt16             m_subType;     //if 1, it is a global
                                  nearest peers
BYTE               m_Data[0];     //the random peer IDs,
                                  port numbers
and contactinfos
};
```

3.2.3.7 Request to Connect

When a peer A wants to add a peer B as its out-link, it sends a connection request to peer B. Peer B can determine to accept or reject the request. An embodiment of the message is as follows:

```
struct MOVERLAY_REQ_CON
{
MOVERLAY_HEADER    m_Header;
UInt16             m_subType;     //0: as a nearest outview,
                                  1: as a
random out-link
UInt16             m_Reserved;
Peer_Info          m_Info;        //the source peer ID, port
number and contactinfo
};
```

An embodiment of the acknowledge message is:

```
struct MOVERLAY_ACK_CON
{
MOVERLAY_HEADER    m_Header;
UInt16             m_subType;     //0: refuse; 1: acknowledge
UInt16             m_Reserved;
};
```

3.2.3.8 Join Overlay Request

When a new peer tries to join a membership overlay, it first connects to a bootstrapping node, and sends a join message to the bootstrapping node. Below is an embodiment of a join message sent by a peer, and its acknowledge from a bootstrapping node.

```
//peer send join request to bootstrapping node to join the overlay
struct MOVERLAY_REQ_JOIN
{
MOVERLAY_HEADER    m_Header;
BYTE               m_NeareastNum;   // Number of nearest
                                     peers
BYTE               m_RandomNum;     // Number of random
                                     peers
UInt16             m_Reserved;
GUID               m_VideoID;
Peer_Info          m_Info;
};
```

//bootstrapping node reply peer's join request

```
struct MOVERLAY_ACK_JOIN
{
MOVERLAY_HEADER    m_Header;
UInt16             m_SessionStatus;
UInt16             m_Reserved;
PORTTYPE           m_Port;          //Global unique port of
                                     the overlay
BYTE               m_NeareastNum;   //Number of nearest
                                     peers
BYTE               m_RandomNum;     // Number of random
                                     peers
UInt16             m_OOBMsgLen;     // Length of the
Out-of-Band message
BYTE               m_Data[0];       // Contact Info Data:
//Nearest peers' PeerInfo, sorted from near to far
//Random peers' PeerInfo
//Out of Band Data: struct BootstrappingVideoInfo
};
```

3.2.3.9 Quit Message

When a peer tries to quit a membership overlay, it sends a quit to the bootstrapping node and all its neighbors. This message has no acknowledge message. Any peer who receives this message only deletes the peer from its neighborhood.

//Peer sends quit msg to bootstrapping node and other neighbors to quit the overlay.

```
struct MOVERLAY_QUIT
{
    MOVERLAY_HEADER    m_Header;
    GUID               m_VideoID;
};
```

//Bootstrapping node floods quit message to all peers to destroy the overlay

```
struct MOVERLAY_FLOOD_QUIT
{
MOVERLAY_HEADER    m_Header;
GUID               m_VideoID;
PORTTYPE           m_Port;     // Global unique port of the
                                  overlay
};
```

3.2.4 Streaming Overlay Level Protocol

Figure 15:
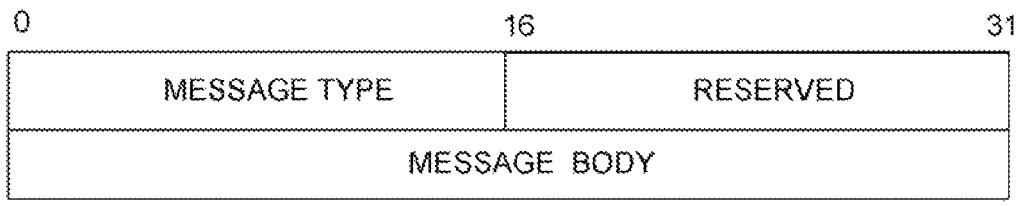
FIG. 15 is a block diagram of a Media Streaming Protocol (MSP) packet header in accordance with an embodiment of the invention.

An embodiment of a Media Streaming Protocol (MSP) packet header is shown in FIG. 15 and described below.

MESSAGE TYPE: 16-bit field contains message type information. The message type is defined as:

```
#define  MSP_DATA         0x8001    // Media data message
// direct download
#define  MSP_REQ_DLV      0x8015    // Request to download live video
#define  MSP_STP_DLV      0x8016    // Stop download live video
// Prefetch media messages
#define  MSP_SUB_LVS      0x8101    // Subscribe live video strip
#define  MSP_ACK_LVS      0x8102    // Acknowledge to live video strip
subscription
// Pull media messages
#define  MSP_NTF_BUFMAP   0x8111    // Buffer map notification to publish
#define  MSP_REQ_DLVB     0x8112    // Request live video blocks download
// Partnership messages
#define  MSP_REQ_PCL      0x8201    // Request partner candidate list
#define  MSP_ACK_PCL      0x8202    // Acknowledge partner candidate list
#define  MSP_NTF_ALB      0x8203    // Availability notification to be flooded
#define  MSP_REQ_PARTNER  0x8204    // Request to establish partnership
#define  MSP_ACK_PARTNER  0x8205
#define  MSP_BYE_PARTNER  0x8206
```

3.2.4.1 Partnership Messages

A new joined peer can query partner candidates from another peer in the overlay by sending the following request message:

```
// partnership
struct Message_MSP_REQ_PCL    // Request partner candidate list
{
    UInt32 reserved;
};
```

The queried peer sends back the following acknowledge message which includes all of its partner candidates:

```
struct Message_MSP_ACK_PCL    // Acknowledge partner candidate
                                 list
{
    UInt16 count;
    GUID peerID;
    UInt16 length;
    UInt8 contact[0];    // contact info, totally length Bytes
                         // totally count candidates
};
```

When a peer wants to establish the partnership with another peer, it sends the following partnership message:

```
struct Message_MSP_REQ_PARTNER    // Request to establish
                                     partnership
{
    GUID peerID;                  // my peer id
    UInt16 length;                // length of contact info, in
                                     Bytes
    UInt8 contact[0];             // contact info, totally length
                                     Bytes
};
```

The receiver sends back the acknowledge message to establish or refuse the partnership:

```
struct Message_MSP_ACK_PARTNER
{
  enum ACK_Partner
  {
    ptOK            = 0x00,
    ptPoorThroughput = 0x01,
    ptTooManyPartners = 0x02,
    ptPartnerDenied = 0x03,
    ptNotEnoughBw   = 0x04,
    ptUnknown = 0x10
  };
  UInt8 result;    // 0 means success, others mean error type
  UInt32    reserved;
};
```

Either of the two peers can send the following bye message to terminate the partnership:

```
struct Message_MSP_BYE_PARTNER
{
  enum Bye_Reason
  {
    brQuit          = 0x00,
    brPoorThroughput = 0x01,
    brTooManyPartners = 0x02,
    brUareNotMyParner = 0x03,
    brUnknown       = 0x10
  };
  UInt8 reason;    // possible reasons: peer quit, poor throughput
  UInt32 reserved;
};
```

When the peer starts receiving streaming packets and becomes available for other peers to get data from it, it notifies its neighbors in two hops through the following message. The neighbors add it to their candidates lists. An embodiment of an availability notification message is as follows:

```
struct Message_MSP_NTF_ALB    // Availability notification to be
                              flooded
{
  GUID peerID;                // my peer id
  UInt16 length;              // length of contact info, in Bytes
  UInt8 contact[0];           // contact info, totally length Bytes
};
```

3.2.4.2 Prefetch Messages

When a peer needs to prefetch media data from another peer, it sends the following subscribe message to it.

```
// push media
struct Message_MSP_SUB_LVS    // Subscribe live video strip
{
  UInt32 stripFlag;           // bits of 1 mean strips of interest
  UInt32 reserved;
};
```

When the destination peer receives the message and decides to accept or reject this subscription and send a acknowledge message back.

```
struct Message_MSP_ACK_LVS    // Acknowledge to live video strip
                              subscription
{
  UInt32 stripAccepted;       // bits of 1 mean strips of successful
                              subscription
  UInt32 reserved;
};
```

3.2.4.3 Pull Messages

To reflect the status of the current buffer, each peer may advertise its buffer map to all its partners through the following message:

```
struct Message_MSP_NTF_BUFMAP   // Buffer map notification to
                                publish
{
```

```
  UInt32 maxSeqNo;              // max sequence number of
                                the buffer
  UInt32 lenWords;              // length of buffMap, in
                                32bit-Words
  UInt32 bufferMap[0];          // bit vector representation
  for buffer map,
  bufferMap[nBufferMapWords]
};
```

According to the partner's buffer map, a peer can send the pull request message to pull the packet from the partner:

```
struct Message_MSP_REQ_DLV    // Request live video blocks
                              download
{
  UInt32 maxSeqNo;            // max sequence number of the buffer
  UInt32 lenWords;            // length of buffMap, in 32bit-Words
  UInt32 bufferMap[0];        // bit vector representation for buffer
map, bufferMap[nBufferMapWords]
};
```

3.2.4.4 Direct Download Messages

The first several peers in the streaming overlay network download from the hosting node directly using the following messages:

```
// direct download
struct Message_MSP_REQ_DLV    // Request to download live video
{
  GUID videoID
  UInt32 reserved;
};
struct Message_MSP_STP_DLV    // Stop download live video
{
  GUID videoID
  UInt32 reserved;
};
```

3.2.4.5 Media Data Messages

The media data message includes the actual video streaming packets with a global numbered sequence number.

```
struct Message_MSP_DATA    // Media data message
{
  UInt32 seqNo;            // sequence number
  UInt16 reserved;
  UInt8 data[0];
};
```

Various operations of embodiments of the present invention are described herein. In one embodiment, one or more of the operations described may constitute computer readable instructions stored on computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of embodiments of the invention, including what is described in the Abstract, is not intended to be exhaustive or to limit the embodiments to the precise forms disclosed. While specific embodiments and examples of the invention are described herein for illustrative purposes, various equivalent modifications are possible, as those skilled in the relevant art will recognize in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A method, comprising:
   receiving a prefetch request for a particular packet of a video stream at a peer from one or more partners of the peer, wherein the one or more partners comprise a subset of peers of a peer-to-peer overlay;
   receiving a packet of the video stream at the peer;
   pushing the packet, by the peer, to an individual partner of the one or more partners whose associated prefetch request matches the packet; and
   updating a local copy of the individual partner's buffer map at the peer after pushing the packet, wherein the buffer map indicates packets of the video stream available in a partner packet queue.

2. The method of claim 1, further comprising sending individual prefetch requests of the peer to the one or more partners.

3. The method of claim 1, further comprising pulling a needed packet from the individual partner or another individual partner of the one or more partners, by the peer, when a pull condition is triggered.

4. The method of claim 1, further comprising:
   sending a join request to a bootstrapping node to join the peer-to-peer overlay by the peer;
   receiving peer information regarding one or more peers of the peer-to-peer overlay from the bootstrapping node; and
   joining the peer-to-peer overlay by the peer.

5. The method of claim 1, further comprising updating the subset of peers in response to a loss of communication with the individual partner or another individual partner of the one or more partners.

6. The method of claim 1, further comprising updating the subset of peers in response to an individual peer entering or leaving the peer-to-peer overlay.

7. One or more volatile or non-volatile computer readable storage media including computer readable instructions that, when executed, perform a method comprising:
   receiving, at a peer, a prefetch request associated with a video stream from one or more partners of the peer, wherein the one or more partners comprise a subset of peers of a peer-to-peer overlay;
   receiving a packet of the video stream at the peer;
   pushing the packet, by the peer, to at least one partner of the one or more partners whose associated prefetch request matches the packet; and
   updating a local copy of the at least one partner's buffer map at the peer after pushing the packet, wherein the buffer map indicates packets of the video stream available in a partner packet queue.

8. The one or more computer readable storage media of claim 7, further comprising sending individual prefetch requests of the peer to the one or more partners.

9. The one or more computer readable storage media of claim 7, further comprising pulling a needed packet from the at least one partner or at least one other partner of the one or more partners, by the peer, when a pull condition is triggered.

10. The one or more computer readable storage media of claim 7, further comprising:
    sending a join request to a bootstrapping node to join the peer-to-peer overlay by the peer;
    receiving peer information regarding one or more peers of the peer-to-peer overlay from the bootstrapping node; and
    joining the peer-to-peer overlay by the peer.

11. The one or more computer readable storage media of claim 7, further comprising updating the subset of peers in response to a loss of communication with the at least one partner or at least one other partner of the one or more partners.

12. The one or more computer readable storage media of claim 7, further comprising updating the subset of peers in response to an individual peer entering or leaving the peer-to-peer overlay.

13. A system comprising:
    one or more computing devices; and
    at least one subsystem comprising individual nodes implemented by at least one of the one or more computing devices, the at least one subsystem configured to:
    receive, at a peer, a prefetch request associated with a video stream from one or more partners of the peer, wherein the one or more partners comprise a subset of peers of a peer-to-peer overlay;
    receive a packet of the video stream at the peer;
    push the packet, by the peer, to at least one partner of the one or more partners whose associated prefetch request matches the packet; and
    update a local copy of the at least one partner's buffer map at the peer after pushing the packet, wherein the buffer map indicates packets of the video stream available in a partner packet queue.

14. The system of claim 13, wherein the at least one subsystem is further configured to send individual prefetch requests of the peer to the one or more partners.

15. The system of claim 13, wherein the at least one subsystem is further configured to pull a needed packet from the at least one partner or at least one other partner of the one or more partners, by the peer, when a pull condition is triggered.

16. The system of claim 13, wherein the at least one subsystem is further configured to:
    send a join request to at least one node of the individual nodes to join the peer-to-peer overlay by the peer;
    receive peer information regarding one or more peers of the peer-to-peer overlay from the at least one node; and
    join the peer-to-peer overlay by the peer.

17. The system of claim 13, wherein the at least one subsystem is further configured to update the subset of peers in response to a loss of communication with the at least one partner or at least one other partner of the one or more partners.

18. The system of claim 13, wherein the at least one subsystem is further configured to update the subset of peers in response to an individual peer entering or leaving the peer-to-peer overlay.

* * * * *

UNITED STATES PATENT AND TRADEMARK OFFICE
CERTIFICATE OF CORRECTION

| | | |
|---|---|---|
| PATENT NO. | : 7,733,808 B2 | Page 1 of 1 |
| APPLICATION NO. | : 11/558878 | |
| DATED | : June 8, 2010 | |
| INVENTOR(S) | : Yusuo Hu et al. | |

It is certified that error appears in the above-identified patent and that said Letters Patent is hereby corrected as shown below:

In column 9, line 17, after "includes" insert -- k --.

Signed and Sealed this
Twenty-fourth Day of May, 2011

David J. Kappos
*Director of the United States Patent and Trademark Office*